April 5, 1932.  R. B. BRYANT  1,852,692
AUTOMATIC OPERATOR
Filed Feb. 28, 1930  2 Sheets-Sheet 1

Inventor
Roy B. Bryant
By Jack A. Schley
Attorney

April 5, 1932.  R. B. BRYANT  1,852,692
AUTOMATIC OPERATOR
Filed Feb. 28, 1930   2 Sheets-Sheet 2
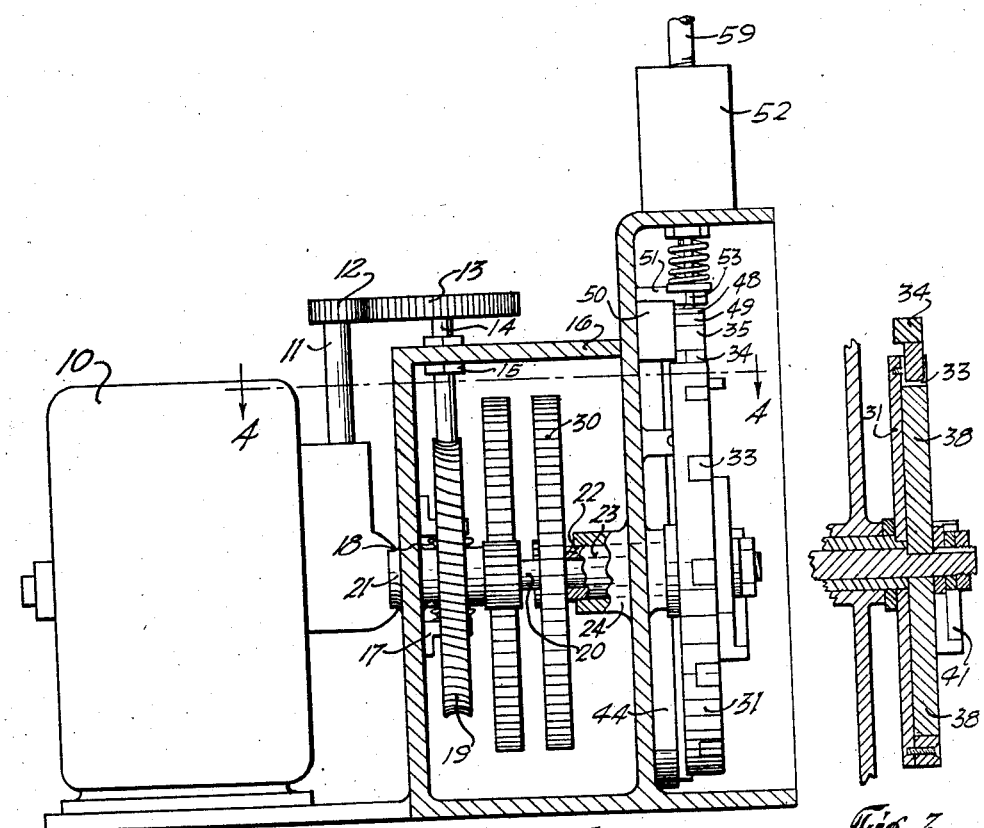
Fig. 2
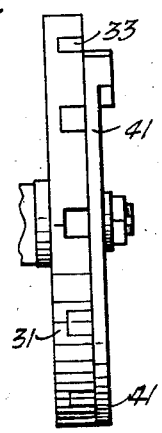
Fig. 3
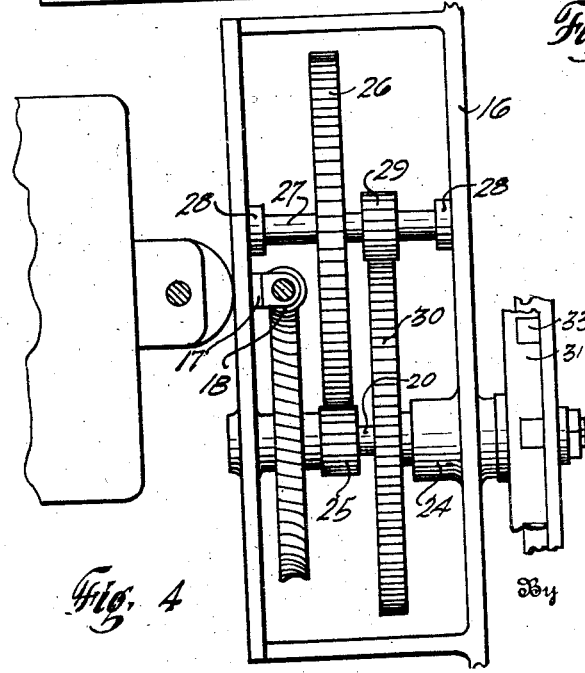
Fig. 4
Fig. 5
Inventor
Roy B. Bryant
By
Jack A. Schley
Attorney Patented Apr. 5, 1932

1,852,692

UNITED STATES PATENT OFFICE

ROY B. BRYANT, OF DALLAS, TEXAS

AUTOMATIC OPERATOR

Application filed February 28, 1930. Serial No. 432,089.

This invention relates to new and useful improvements in automatic operators.

One object of the invention is to provide an improved automatic operator having means for intermittently actuating a valve plunger, whereby said valve is automatically opened and closed.

Another object of the invention is to provide an operator having means for predetermining the periodic intervals at which the intermittent actuation of the valve plunger takes place.

A further object of the invention is to provide means for adjusting the predetermining means whereby the length of the periodic intervals may be varied.

An important object of the invention is to provide adjustable means for predetermining the interval between the opening and closing of the valve, whereby said interval may be varied.

A still further object of the invention is to provide means for actuating the valve plunger in a quick and positive manner, whereby the operation of the valve is assured.

A construction designed to carry out the invention will be hereinafter described together with other features of the invention.

Figure 1:
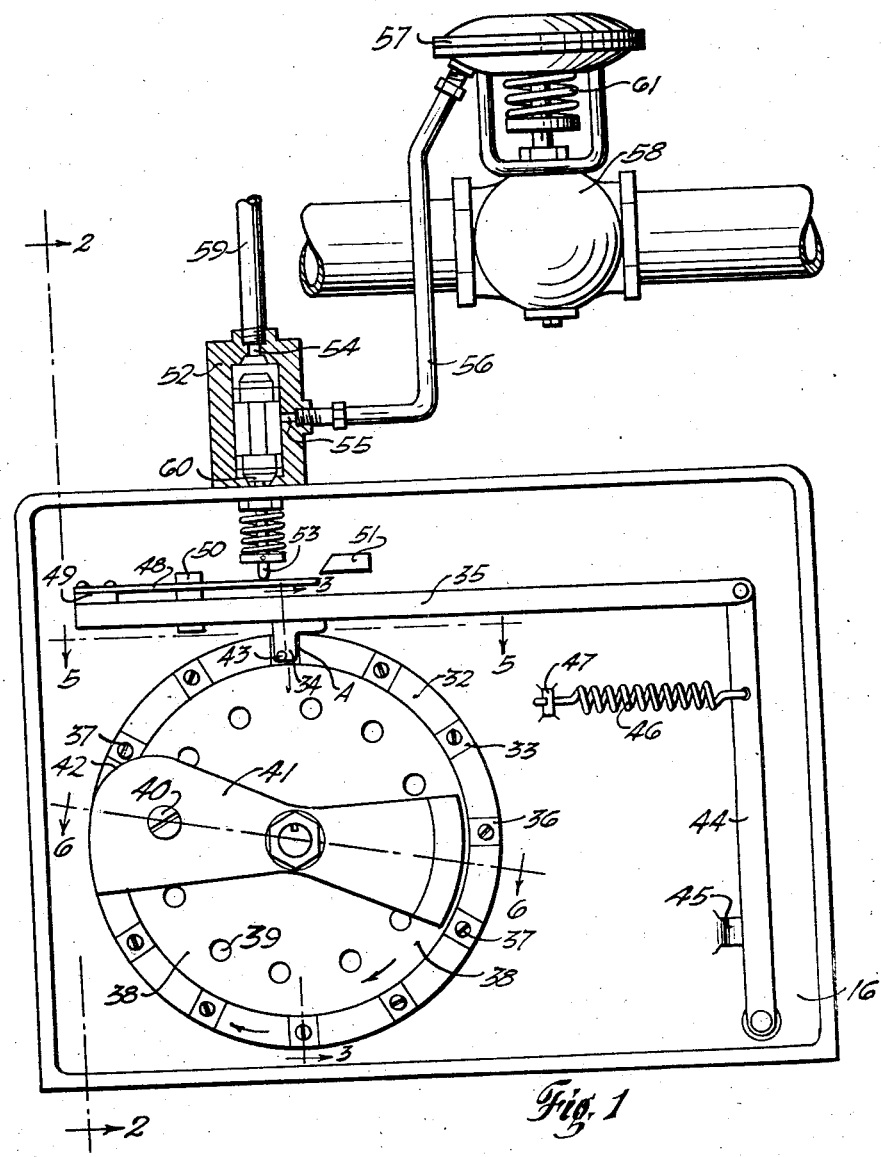
Figure 6:
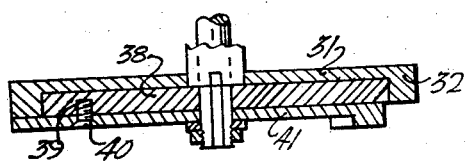

The invention will be more readily understood from a reading of the following specification and by reference to the accompanying drawings in which an example of the invention is shown, and wherein:

Figure 1 is a front elevation of a device constructed in accordance with the invention as applied to a gate valve for controlling the same, Figure 2 is a vertical sectional view taken on the line 2—2 of Figure 1, Figure 3 is a partial vertical sectional view taken on the line 3—3 of Figure 1, Figure 4 is a horizontal sectional view taken on the line 4—4 of Figure 2, Figure 5 is a partial plan view of the timing disks taken on the line 5—5 of Figure 1, and Figure 6 is a cross sectional view of the timing disks taken on the line 6—6 of Figure 1.

In the drawings the numeral 10 designates an electric motor having a vertical shaft 11 connected with its armature shaft. A gear 12 on the shaft 11 is meshed with a gear 13 on a counter shaft 14. The shaft 14 is mounted through a bearing 15 in the top of a housing 16 and is supported by brackets 17 secured to the side of said housing. A worm screw 18 is mounted on the shaft 14 intermediate the brackets 17 and is engaged with a gear 19 on a drive shaft 20. One end of the shaft 20 is journaled in a bearing 21 in the side of the housing while the other end of said shaft is journaled in a central bore 22 of a second drive shaft 23 which in turn is journaled in a bearing 24 of the housing.

A pinion 25 secured on the shaft 20 is meshed with a gear 26 secured on a counter shaft 27 which is journaled in bearings 28 of the housing. The counter shaft 27 likewise has a pinion 29 secured thereon and meshed with a gear 30 mounted on the second drive shaft. A circular disk 31 mounted on the second drive shaft 23 is provided on one side with a shoulder 32. Said shoulder has a plurality of radial slots 33 equally spaced therein.

A dog 34 depending from the underside of a lever 35 is positioned so that it will ride upon the periphery of the shoulder 32 and engage in the slots 33. Blocks 36 may be secured in the slots by screws 37 to prevent the dog from engaging therein. A circular disk 38 is mounted on the shaft 20 adjacent the disks 31 and within the shoulder. A plurality of threaded holes 39 are provided in the disk 38 for receiving a set screw 40 of a balanced arm 41, whereby the arm may be adjusted to different positions. One end of the arm extends flush with the periphery of the shoulder 32 and is provided with a cam face 42.

The shaft 20 is geared so that the disk 38 will revolve once every twenty minutes while the shaft 23 is geared so that the disk 31 will revolve once every hour. It is to be understood that the invention is not to be limited to any definite revolutions per hour of the shafts 20 and 23, as such revolutions herein stated have only been used to clearly illustrate and explain the invention.

It is important, though, that the disk 38 revolve faster than the disk 31 so that the cam face 42 of the arm will engage a pin 43 on the dog 34, when the dog is engaged in one of the slots 33, thereby disengaging said dog from said slot.

The lever 35 has one end pivoted to the upper end of an upright bar 44 which has its lower end pivoted to the housing 16. The bar 44 is tensioned against a stop 45 protruding from the housing, by a spring 46 secured intermediate the bar and a boss 47 of the housing. A flat spring 48 extending longitudinally of the bar 35 has one end secured to the outer end of said bar and is held therefrom by a washer 49.

A guide block 50 is secured to the housing adjacent the bar 35 to position the same whereby the dog will be held in position to engage in the slots 33. A check block 51 extends from the housing adjacent the free end of the spring 48 so that when the dog 34 is engaged in one of the slots 33 the rotation of the disk 31 will move the lever to the right (Figure 1) and thereby engage the spring 48 beneath the check block. A pressure control valve 52 having a spring release is positioned so that its spring tensioned plunger 53 contacts with the spring 48 when the valve is in an open position and the dog is engaged in one of the slots.

The valve has an outlet port 55 connected by a conductor 56 to a diaphragm 57 of a gate valve 58. An inlet port 54 of the valve has a pressure conductor 59 connected thereto leading from any suitable pressure source for supplying pressure through the outlet port 55 to the diaphragm 57 when the valve 52 is in an open positon (Figure 1). The control valve also has an exhaust port 60 for relieving the pressure on the diaphragm 57 when said control valve is closed thereby allowing the gate valve to close under tension of its spring 61.

As shown in Figure 1 the disk 31 is provided with twelve slots 33, and as said disk revolves once every twelve hours, one hour will elapse between the engagements of the dog 34 with each succeeding slot. By securing the blocks 36 in the slots desired the dog will ride upon said blocks and over said slots; thereby providing adjustable means whereby the device may be made to operate from once every hour to once every twelve hours. Obviously by changing the motor speed or the relation of the driving gears the operating speed of the device may be increased or decreased as desired. As the valve 52 is open when the dog 34 is engaged in one of the slots 33 the time the valve remains open depends on the position of the arm 41.

The arm 41 is shown (Figure 1) adjusted to the disk 38 in a position to disengage the dog from the slot at approximately five minutes after the engagement thereof. As the disk 38 revolves once every twenty minutes the arm may be adjusted to allow the valve to remain open from approximately twenty minutes to one minute. Obviously by changing the motor speed or the relation of the gears the duration of the open position of the valve may be varied as desired.

It will be observed that in Figure 1 of the drawings I have shown the annular shoulder 32 provided with twelve slots 33 and by timing the disk so as to revolve once in each twelve hours, the slots would provide for an operation each hour, if left open. I have shown all of the slots except A closed with the blocks 36 and thus the disk as illustrated is arranged to operate only once in each twelve hours. By changing the number of slots or varying the speed of rotation of the disks, the intervals between operations may be varied.

When the dog 34 rests in the slot A the valve 52 will be open, as is shown in Figure 1, and when the dog is riding on the face of the shoulder 32 the valve will be closed; therefore, the valve remains open only so long as the dog is in one of the slots. It will be noted that the slot is wider than the dog so as to permit a free engagement and also that by reason of the bar 44 and spring 46 the dog may undergo a lateral movement as the disk revolves.

The dog 34 will remain in the slot A until the cam 42 of the arm 41 engages the pin 43 and lifts said dog from the slot. The arm 41 being fastened to the disk 38, it is obvious that the speed of revolution of said disk will control the period of time required for the arm to engage the pin and raise the dog; therefore, the valve remains open for this period. In the present gearing arrangement the disk 38 is timed to make a complete revolution each twenty minutes and if the dog 34 drops into the slot A with the parts positioned as shown in Figure 1, a period of approximately five minutes will elapse before the pin 43 is engaged and the dog lifted from the slot A, thus closing the valve.

When the dog 34 drops into the slot A, the spring 48 will be carried below the check 51 and as the disk 31 continues to revolve the lever 35 is moved to the right, engaging the free end of the spring 48 under the check 51 and also putting the bar 44 under tension of the spring 46. As the arm contacts with the pin 43 the dog is lifted from engagement with the slot and the spring 48 is held under tension by the check 51. When the dog is freed from the slot the lever 35 is thrust to the left by tension of the spring 46, thereby freeing the spring 48 and allowing the same to raise the plunger and close the valve 52. The sudden upward thrust of the plunger caused by the releasing of the spring 48 when under tension will exert sufficient force to break the pressure in the valve, thereby assuring the positive operation of said valve.

Various changes in the size and shape of the different parts, as well as modifications and alterations, may be made within the scope of the appended claims.

What I claim, is:

1. In an automatic operator, a control valve having a plunger, movable means engaging said plunger for holding said valve in a normally closed position, means on the movable means for actuating said plunger to open the valve at predetermined intervals and variable means operating at a different speed to that of the movable means for predetermining the periods of time the valve remains open.

2. The combination set forth in claim 1, with means for operating said movable means and said variable means.

3. In an automatic operator, a control valve, a spring tensioned release plunger on said valve, means engaging the plunger for suddenly actuating the same to close and open the valve, movable elements operating at different speeds for intermittently operating the plunger actuating means, and means for driving the movable elements.

4. The combination set forth in claim 3, with means carried by one of the movable elements for predetermining the intermittent intervals of the plunger actuation, and means carried by the other movable element for predetermining the periods of time the valve remains open.

5. In an automatic operator, a pressure control valve, a spring tensioned plunger for holding the valve normally open, a spring engaging said plunger to close the valve when said spring is tensioned, a pair of disks revolving in the same direction and at different speeds, means on the slower revolving disk for relieving the spring tension on the plunger to open the valve, means on the faster revolving disk for increasing the spring tension on the plunger to close the valve, and means for releasing the spring under tension to engage the plunger.

6. The combination set forth in claim 5, with adjustable means on the slower revolving disk for varying the intervals of actuation of the plunger to open the valve, and adjustable means on the faster revolving disk arranged in relation to the slower revolving disk for varying the period of time of the open position of the valve.

7. In an automatic operator, a control valve, a pair of revolving elements for intermittently actuating said valve, said elements revolving in the same direction but at different speeds, means for revolving said elements, and means on the elements for varying the intermittent actuation of the valve.

In testimony whereof I affix my signature.

ROY B. BRYANT.